C. W. LANDERS.
MOTOR AND DYNAMO CONSTRUCTION.
APPLICATION FILED APR. 16, 1920.

1,375,161.

Patented Apr. 19, 1921.
2 SHEETS—SHEET 1.

Inventor
Clyde W. Landers
By
Attorney

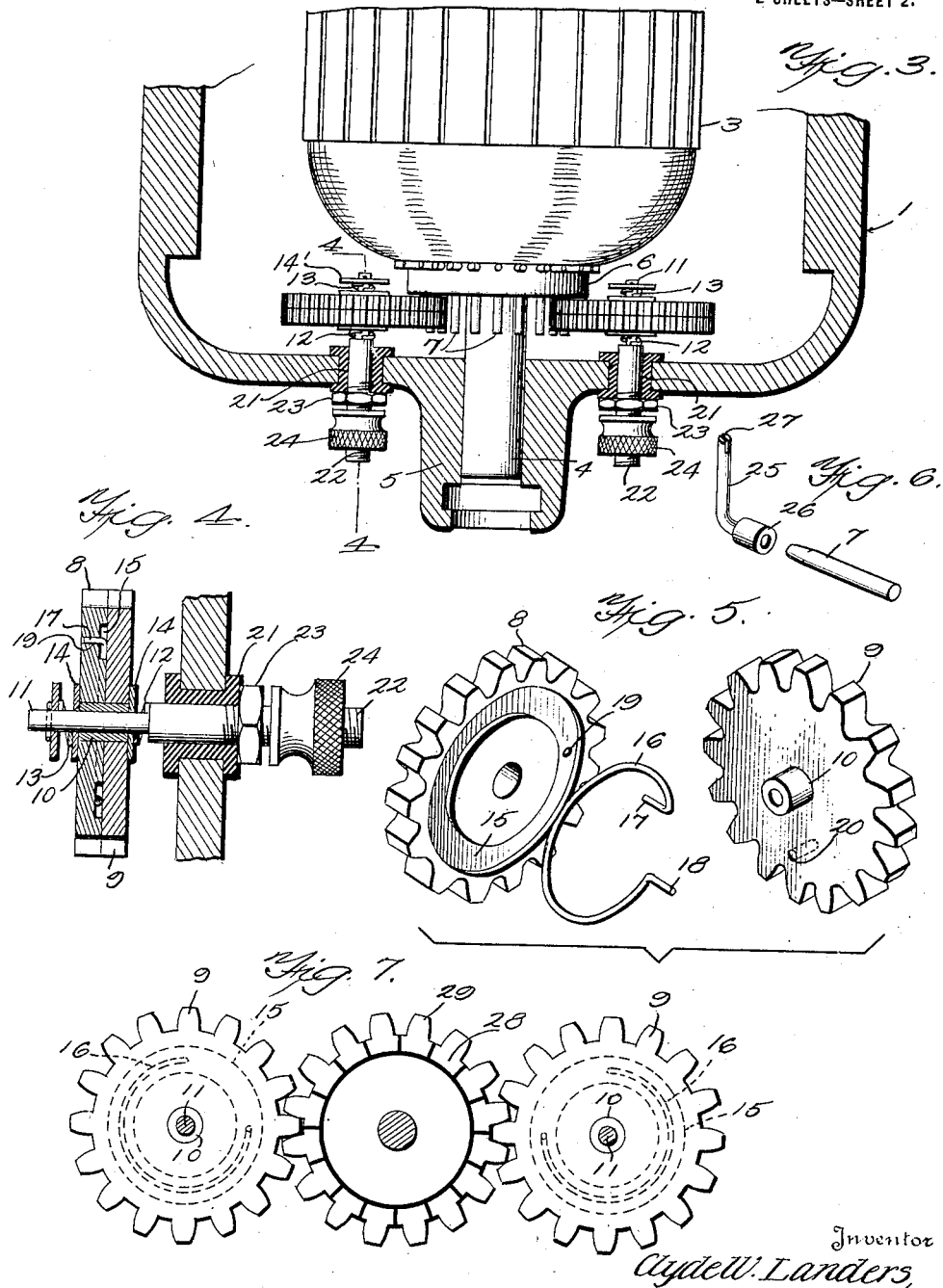

UNITED STATES PATENT OFFICE.

CLYDE W. LANDERS, OF NEW YORK, N. Y.

MOTOR AND DYNAMO CONSTRUCTION.

1,375,161.  Specification of Letters Patent. Patented Apr. 19, 1921.

Application filed April 16, 1920. Serial No. 374,292.

*To all whom it may concern:*

Be it known that I, CLYDE W. LANDERS, a citizen of the United States, residing at New York, in the county of New York and State of New York, have invented certain new and useful Improvements in Motor and Dynamo Constructions, of which the following is a specification.

This invention relates to improvements in motor and dynamo construction and it comprises the combination with the field and armature of a direct current motor, of connecting means comprising an insulating ring mounted on the shaft of the revolving element, said ring being provided with a plurality of projecting pins corresponding in number to the coils of the revolving element, a plurality of sets of tooth wheels arranged near the revolving ring and meshing with said pins, each set comprising a pair of gears arranged so that the teeth of the gears are normally out of alinement with each other and are adapted to be brought into alinement upon meshing with the pins, the sets of tooth wheels being mounted on shafts serving as conductors or leads, said shafts being provided with the usual binding post construction for the attachment of the wires; all as more fully hereinafter set forth and as claimed.

In the usual direct current motor construction, there are many disadvantages. A great deal of trouble is caused by short circuiting between the segments of the commutator causing burnt out coils in the winding of the armature. At the present time, there is a tendency toward heating of the parts of the motor due to the friction necessary to obtain good connection.

In the present construction, I have overcome these disadvantages and have produced a motor and dynamo construction which makes possible the generation of high voltage direct current when the construction is employed in a dynamo and the utilization of such high voltage direct current in a motor so constructed. The trouble caused by short circuiting of the segments of the commutator is eliminated.

The dynamo and motor construction herein provided saves a large percentage of material in construction and reduces friction and heating of parts to a minimum. The provision of the rotating ring having projecting pins together with the meshing tooth wheels comprising two off set gears makes a perfect connection at all times in the circuit and provides a path for the current that is constantly being changed and cooled by air currents passing through the teeth and pins.

Other objects and advantages of the invention will be apparent throughout the course of the following specification.

Referring to the drawings,

Fig. 3 is a plan view of the revolving element of the motor and the sets of tooth wheels, the casing of the motor being shown in section.

Fig. 4 is a detail sectional view on the line 4—4 of Fig. 3.

Fig. 5 is a detail perspective view of a pair of gears forming one set of the tooth wheels.

Fig. 6 is a detail perspective view of means for connecting the ends of the windings of the revolving element to the pins, and Fig. 7 is an end elevation showing a modification of the construction shown in Fig. 2.

Figure 1:
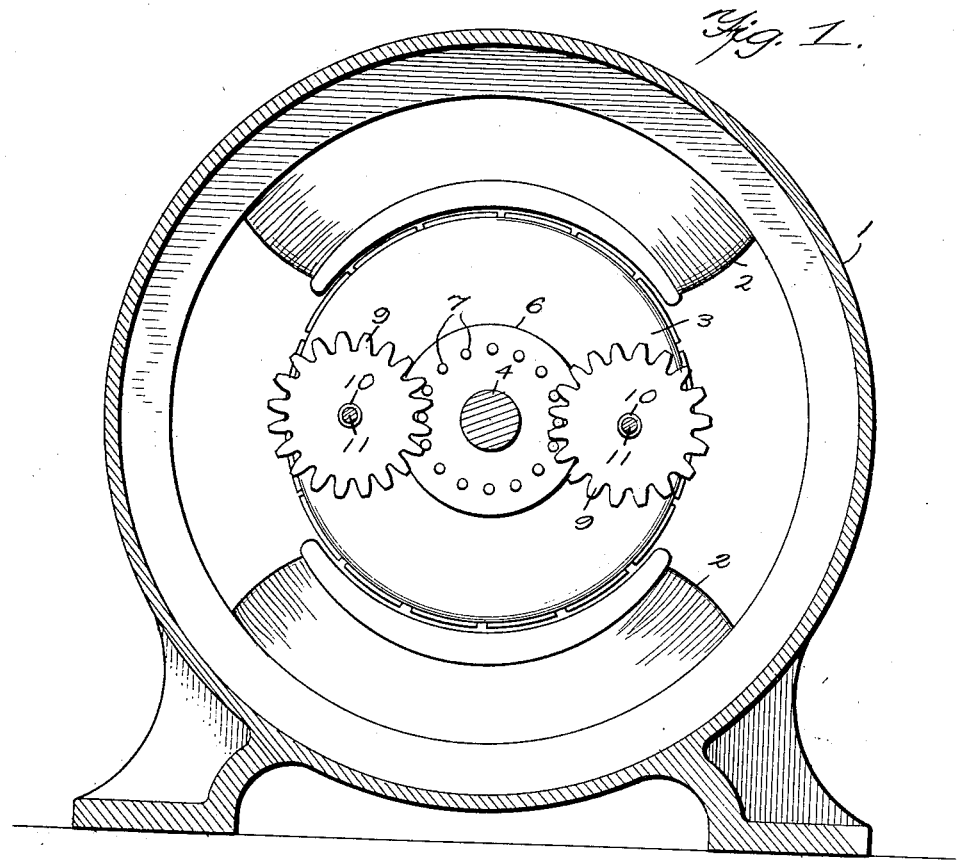
Figure 1 is an elevation of the motor part of the casing being removed and parts being shown in section.
Figure 2:
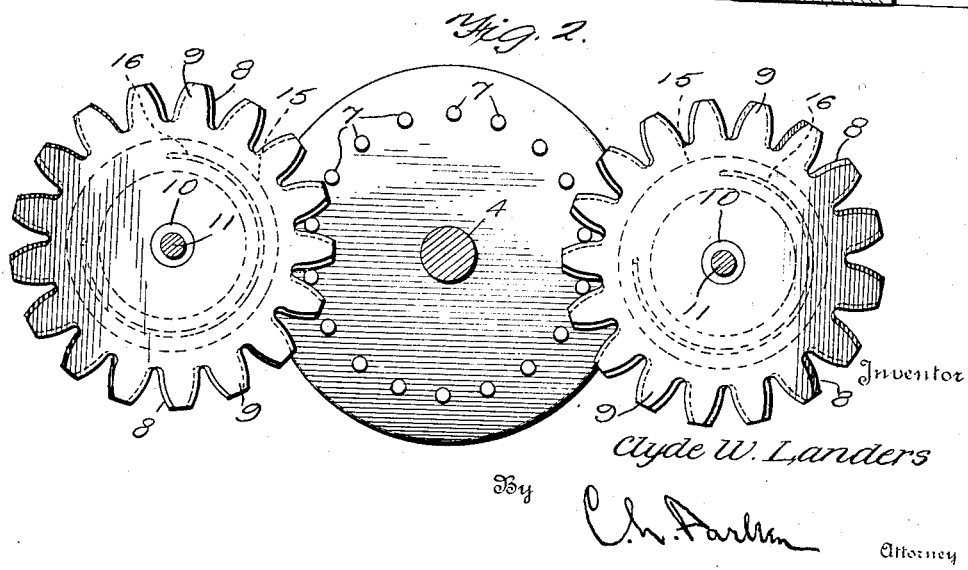
Fig. 2 is an enlarged elevation of the revolving ring carried by the shaft of the revolving element of the motor and the intermeshing sets of tooth wheels.

Referring to Fig. 1 of the drawings, the reference numeral 1 designates the casing of a motor or dynamo of the direct current type, the armature and field being of the usual or ordinary construction. As shown, the motor is provided with a stationary field 2 and a revolving armature 3. The armature is mounted on shaft 4 extending through the casing of the motor and mounted in bearings 5. Arranged on the shaft 5, is an insulating ring 6. A plurality of laterally projecting pins 7 corresponding in number to the number of coils in the armature are mounted in the ring 6. These pins are adapted to mesh with a plurality of sets of tooth wheels, the number of sets of tooth wheels corresponding to the poles of the motor. As shown in the drawings, the motor is of the bi-polar type and two sets of tooth wheels are provided, arranged on opposite sides of the ring 6.

Referring to Figs. 2 to 5 of the drawings, each set of tooth wheels comprises a pair of gears 8 and 9 mounted on a bushing 10 carried by stationary shaft 11. Springs 12 and 13 are arranged on the shaft, at each side of the tooth wheels. These springs are adapted to cause electrical connection between the gear wheels and the shaft through washers 14 held in engagement with the outer faces of the gear wheels by the pressure of the springs. The gears are arranged slightly out of alinement (see Fig. 2) and are maintained in such position by any suitable means.

Any means may be employed for maintaining the two gear wheels forming a set out of alinement with each other. In the drawings, I have illustrated one construction suitable for obtaining this result. As shown, the gear wheel 8 is provided with a groove 15 in one face which is adapted to receive a spring 16 having laterally projecting terminals 17 and 18. These terminals are adapted to be received in openings 19 and 20 arranged in the wheels 8 and 9. The spring is of such length, with respect to the distance between the openings 19 and 20, that it will normally maintain the gear wheel 8 in such position that its teeth will be in the dotted line position illustrated in Fig. 2 of the drawings and out of alinement with the teeth of the wheel 9. When the set of tooth wheels meshes with the pins 7, the gear wheels are moved into alinement against the tension of spring 16 insuring good contact.

Referring to Figs. 3 and 4 of the drawings, the stationary shafts 11 are mounted in insulated bushings 21 arranged in the casing and are threaded as at 22 for the reception of a nut 23 and a jam nut 24. This construction provides binding posts which may be employed for connecting the conducting wires to the motor or dynamo.

Referring to Fig. 6 of the drawings, the pins 7 are connected to the coil windings of the revolving element of the motor by slotted members 25 which are embedded in the ring 6. The ring 6 is preferably made of bakelite or some similar non-conducting composition. As shown, the pins are mounted in sockets 26 of the slotted elements whereby the pins may be removed and new ones inserted when they become worn. Any suitable type of separable connection may be employed to connect the pins to the elements 25. The opposite ends of the elements 25 are provided with slots 27 for the reception of the ends of the wires of the armature windings.

Referring to Fig. 7 of the drawings, I have herein illustrated a modified construction wherein the usual commutator has been modified so as to be capable of use with the sets of tooth wheels. As shown, commutator 28 is provided with teeth 29 which are adapted to mesh with the teeth of the gears 8 and 9 forming the sets of tooth wheels.

The construction herein provided produces a very efficient type of motor or generator that may be employed for high voltage direct current either as a motor or a dynamo. The difficulties encountered in the usual type of motor construction, such as short circuited segments, burnt out armature coils, et cetera, is eliminated and a construction is produced which reduces friction and heating of parts to a minimum.

In the accompanying drawings, for the purpose of illustration, I have shown a single set of tooth wheels mounted on each of the shafts 11. The number of sets of tooth wheels mounted on each shaft may be increased in proportion to the volume of current delivered to a motor or taken from a dynamo within any desired limits. Under such conditions, the desired number of tooth wheels are provided and the length of the pins 7 is varied to suit the number of sets of tooth wheels arranged upon the shafts 11. If a comparatively large number of sets of tooth wheels are employed necessitating a relatively long pin, it is advisable to provide supporting means at the outer ends of the pins. Under such conditions, a ring of insulating material (not shown) similar to the ring 6 is arranged on the main shaft 4 and the ends of the pins are received in this ring.

As illustrated in the drawings, the pins 7 are arranged substantially parallel to the shaft 4. However, the pins may be curved or twisted to produce a helical effect and the teeth of the gear wheels slightly modified or cut away to properly mesh with the pins.

Although I have shown and described a preferred embodiment of the invention, it is to be understood that changes in the detailed construction and arrangement of parts may be resorted to without departing from the spirit of the invention or the scope of the subjoined claims.

What I claim is:

1. In a device of the character described, the combination with a casing, a stationary element and a revolving element, of a gear wheel arranged on each side of said revolving element, conductors electrically connected to said gear wheels, means carried by said revolving element and meshing with said gear wheels, and means revolving with said gear wheel and connected thereto to oppose said meshing and insure good contact between said gear wheels and said first mentioned means.

2. In a device of the character described, the combination with a casing, a stationary element and a revolving element, of a gear wheel arranged on each side of said revolving element, conductors electrically connected to said gear wheels, laterally projecting pins carried by said revolving element and meshing with said gear wheels, and means revolving with said gear wheels and connected thereto to oppose said meshing and insure good contact between said gear wheels and said pins.

3. In a device of the character described, the combination with a casing, a stationary element and a revolving element, of connecting means comprising shafts mounted in the casing, said shafts serving as binding posts, a pair of gear wheels mounted on each of said shafts, the teeth of each pair of gears being out of alinement with each other, and means carried by the revolving element and meshing with said gear wheels, said means being connected to the windings of the revolving element.

4. In a device of the character described, the combination with a casing, a stationary element and a revolving element, of connecting means comprising shafts mounted in the casing, said shafts serving as binding posts, a pair of gear wheels mounted on each of said shafts, the teeth of each pair of gears being out of alinement with each other, and laterally projecting pins carried by the revolving element and meshing with said gear wheels, said pins being connected to the windings of the revolving element.

5. In a device of the character described, the combination with a casing, a stationary element and a revolving element, of laterally projecting pins carried by said revolving element and connected to the windings of the revolving element, shafts mounted in the casing and insulated therefrom, said shafts serving as binding posts, a pair of gear wheels mounted on each of said shafts, the teeth of said gear wheels being disposed out of alinement with each other, means for maintaining said gear wheels in contact with each other, said gear wheels being adapted to mesh with said laterally projecting pins.

6. In a device of the character described, the combination with a casing, a stationary element and revolving element, of laterally projecting pins carried by said revolving element and connecting elements in which said pins are positioned, said elements being connected to the windings of the revolving element, shafts mounted in the casing and insulated therefrom, said shafts serving as binding posts, a pair of gear wheels mounted on each of said shafts, the teeth of said gear wheels being disposed out of alinement with each other, springs arranged on said shafts and forming electrical connections between the shafts and the gear wheels, said gear wheels being adapted to mesh with said laterally projecting pins.

7. In a device of the character described, the combination with a casing, a stationary element and revolving element, of laterally projecting pins carried by said revolving element and connected to the windings of the revolving element, shafts mounted in the casing, and insulated therefrom, said shafts serving as binding posts, a pair of gear wheels mounted on each of said shafts, and a spring secured to said gear wheels and arranged to maintain the teeth of said gear wheels out of alinement with each other, said gear wheels being adapted to mesh with said laterally projecting pins.

8. In a device of the character described, the combination with a casing, a stationary element and revolving element, of laterally projecting pins carried by said revolving element and connected to the windings of the revolving element, shafts mounted in the casing and insulated therefrom, said shafts serving as binding posts, a pair of gear wheels mounted on each of said shafts, said gear wheels being provided with openings in their adjacent faces, a spring disposed between said gear wheels, the ends of the spring being extended laterally and adapted to be received in said openings, means for maintaining said gear wheels in contact with each other, said gear wheels being adapted to mesh with said laterally projecting pins.

9. In a device of the character described, the combination with a casing, a stationary element and a revolving element, of a gear wheel arranged on each side of said revolving element, conductors electrically connected to said gear wheels, laterally projecting pins carried by said revolving element and meshing with said gear wheels, a disk arranged adjacent each of said gear wheels and yieldingly connected thereto to oppose said meshing and insure good contact between said gear wheels and said pins.

10. In a device of the character described, the combination with a casing, a stationary element and a revolving element, of a gear wheel arranged on each side of said revolving element, conductors electrically connected to said gear wheels, laterally projecting pins carried by said revolving element and meshing with said gear wheels, a disk arranged adjacent to each of said gear wheels, and springs arranged between said disks and said gear wheels to oppose said meshing and insure good contact between said gear wheels and said pins.

11. In a device of the character described, the combination with a casing, a stationary element and a revolving element, of a pair of gear wheels arranged on each side of said revolving element, conductors electrically connected to said gear wheels, the teeth of each pair of gears being out of alinement with each other, and means carried by the revolving element and meshing with said gear wheels, said means being connected to the winding of the revolving element.

12. In a device of the character described, the combination with a casing, a stationary element and a revolving element, of a pair of gear wheels arranged on each side of said revolving element, conductors electrically connected to said gear wheels, the teeth of each pair of gears being out of alinement with each other, and laterally projecting pins carried by the revolving element and meshing with said gear wheels, said pins being connected to the windings of the revolving element.

13. In a device of the character described, the combination with a casing, a stationary element and a revolving element, of laterally projecting pins carried by said revolving element and connected to the windings of the revolving element, a pair of gear wheels arranged on each side of said revolving element, the teeth of said gear wheels being disposed out of alinement with each other, means for maintaining said gear wheels in contact with each other, said gear wheels being adapted to mesh with said laterally projecting pins, and conductors electrically connected to said gear wheels.

14. In a device of the character described, the combination with a casing, a stationary element and a revolving element, of laterally projecting pins carried by said revolving element and connecting elements in which said pins are positioned, said elements being connected to the windings of the revolving element, a pair of gear wheels arranged on each side of said revolving element, the teeth of said gear wheels being disposed out of alinement with each other, said gear wheels being adapted to mesh with said laterally projecting pins, springs adapted to hold each pair of gear wheels in contact with each other, and conductors electrically connected to said gear wheels.

15. In a device of the character described, the combination with a casing, a stationary element and a revolving element, of laterally projecting pins carried by said revolving element and connected to the windings of the revolving element, a pair of gear wheels mounted on each side of said revolving element, a spring arranged between each pair of gear wheels, connected thereto, and arranged to maintain the teeth of said gear wheels out of alinement with each other, said gear wheels being adapted to mesh with said laterally projecting pins, and conductors electrically connected to said gear wheels.

16. In a device of the character described, the combination with a casing, a stationary element and a revolving element, of laterally projecting pins carried by said revolving element and connected to the windings of said revolving element, a pair of gear wheels mounted on each side of said revolving element, said gear wheels being provided with openings in their adjacent faces, a spring disposed between said gear wheels, the ends of the spring being extended laterally and adapted to be received in said openings, means for maintaining said gear wheel in contact with each other, said gear wheels being adapted to mesh with said laterally projecting pins, and conductors electrically connected to said gear wheels.

In testimony whereof I affix my signature.

CLYDE W. LANDERS.